United States Patent
Lee et al.

(10) Patent No.: US 11,053,919 B2
(45) Date of Patent: Jul. 6, 2021

(54) VERTICAL AXIS WIND TURBINE WITH WIND VANES

(71) Applicants: Jung Hoon Lee, Wheaton, IL (US);
Jung Woon Lee, Wheaton, IL (US)

(72) Inventors: Jung Hoon Lee, Wheaton, IL (US);
Jung Woon Lee, Wheaton, IL (US)

( * ) Notice: Subject to any disclaimer, the term of this patent is extended or adjusted under 35 U.S.C. 154(b) by 0 days.

(21) Appl. No.: 14/017,253

(22) Filed: Sep. 3, 2013

(65) Prior Publication Data
US 2015/0110598 A1    Apr. 23, 2015

(51) Int. Cl.
*F03D 3/06*    (2006.01)
*F03D 7/06*    (2006.01)

(52) U.S. Cl.
CPC ............... *F03D 7/06* (2013.01); *F03D 3/068* (2013.01); *Y02E 10/74* (2013.01)

(58) Field of Classification Search
CPC ............. F03D 3/068; F03D 7/06; Y02E 10/74
See application file for complete search history.

(56) References Cited

U.S. PATENT DOCUMENTS

| | | | | |
|---|---|---|---|---|
| 1,352,859 A * | 9/1920 | Wilson | ............ | F03D 3/068 416/17 |
| 1,363,174 A * | 12/1920 | Bellows | ............ | F03D 3/068 416/112 |
| 2010/0207396 A1 * | 8/2010 | Simon | ............ | H02P 9/06 290/55 |
| 2011/0076144 A1 * | 3/2011 | Lucas | ............ | F03B 17/067 416/79 |
| 2011/0084492 A1 * | 4/2011 | Durham | ............ | F03D 3/068 290/55 |
| 2012/0183400 A1 * | 7/2012 | Onodera | ............ | F03D 3/068 416/142 |
| 2012/0207604 A1 * | 8/2012 | Hobson | ............ | F03D 3/005 416/147 |
| 2015/0037151 A1 * | 2/2015 | Tai | ............ | F03D 9/002 416/41 |
| 2015/0369216 A1 * | 12/2015 | Kisovec | ............ | F03D 3/068 290/44 |

* cited by examiner

*Primary Examiner* — Matthew T Largi
(74) *Attorney, Agent, or Firm* — Sang Ki Lee; Law Offices of Sang Lee (57) ABSTRACT

An embodiment of Vertical Axis Wind Turbine (VAWT) concept with eight rotating impellers with eight rotating wind vanes, wherein each wind vane is attached to each impeller through the vane angle adjusting devices is described. Further described is the vane angle adjusting device with coupling blocking fork and the impeller with the high load capacity and increased output. In addition, the gear reducer module and the cone clutch are described that control the power transmission from the wind vane and the impeller in case of strong gusts or wind. This feature allows for a number of improvements over the current state of the art including high energy efficiency, damage protection and the ability to remain operational during high wind conditions.

14 Claims, 6 Drawing Sheets

VERTICAL AXIS WIND TURBINE WITH WIND VANES

STATEMENT REGARDING FEDERALLY SPONSORED RESEARCH OR DEVELOPMENT

Not Applicable

FIELD

The present invention relates to a wind turbine generator, more specifically, a vertical-axis wind turbine generator with rotation axis substantially at right angle to the direction of wind that includes a central shaft with eight rotating wind vanes and eight impellers, wherein each rotating wind vane is attached to each impeller with vane angle adjusting device with coupling blocking fork. In addition, the gear reducer module and the cone clutch are described that control the power transmission from the wind vane and the impeller in case of strong gusts or wind.

BACKGROUND

Wind turbine is the most popular way of harvesting wind energy. Wind turbines are categorized as Horizontal-axis Wind Turbine (HAWT) and Vertical-axis Wind Turbines (VAWT). Researchers Erikson, Bernhoff and Leijon compared VAWT and HAWT designs in their article titled "Evaluation of different turbine concepts for wind power" which was published in 2008 in Renewable & Sustainable Energy Review issue 12. According to this article, HAWT design which most commercial wind farms utilize are considered complicated due to yaw mechanism which orients the turbine toward the wind and pitch mechanism that regulates the speed of the propeller. The article also mentions that HAWT designs are hard to maintain due to the fact that generator assembly is placed high above the ground. These mechanisms complicate the HAWT design and makes maintenance difficult due to the fact that all these mechanisms are placed high above the ground. The article also mentions that HAWT designs have almost reached their maximum possible size for megawatt level applications due to cyclically reversing gravitational loads on their blades.

Vertical-axis Wind Turbines (VAWT) may seem simpler in terms of structure due to the fact that they do not require to be oriented toward the wind. According to Erikson et al., this omni-directional nature of the turbine makes it very attractive for locations where wind frequently changes its direction. However, VAWT design has also has its own complications. Theoretically the efficiency of VAWT design is less than the efficiency of HAWT design due to the active area of the turbine which faces the wind. The theoretical maximum power coefficient of wind turbines is called Betz limit and found to be Cp=0.59. For HAWT designs this factor of performance is between 0.40 and 0.50. In case of VAWT designs this factor is found to be no more than 0.40 [Erikson et al.]Another factor of VAWT design that negatively affects the efficiency is the fact that while one of the vanes of VAWT is exposed to wind and converting the wind energy, another vane is being moved against the wind to continue the rotation of the turbine.

Despite all these negative points, mechanical simplicity of VAWT makes it very attractive for commercial wind farm applications. According to the literature, VAWT turbines can be packed denser than HAWT turbines since that cause less turbulence. However, there are still some difficulties that hinder the application of VAWT designs in wind farm applications. Currently VAWT has three major obstacles which impede its commercial applicability. These are;

1. Low Energy Efficiency. The efficiency of VAWT design is less than the efficiency of HAWT design due to the active area of the turbine which faces the wind.
2. Storm protection. When wind speed reaches gale force level, there should be a mechanism to shut down the turbine and mechanically protect the structure and the vanes of the turbine from damage. This is not available with traditional VAWT designs like Savonius, Darrius and H-rotor design.
3. Speed regulation. There is a need for a speed control mechanism to regulate the rotational speed of the turbine so that power generated is less dependent on the wind speed.

These three problems are the main obstacles toward the commercialization of VAWT design. Recently there are attempts to solve these two problems. One of the most notable attempts is a patent filed by Sullivan with publication number US 2010/0172759 which uses airfoil shaped vanes and a mechanism for retracting vanes toward the rotational shaft on demand. The mentioned design is very similar to H-rotor design with retraction and storm protection capability added. Also, a patent filed by Ozkul with publication number WO 2011/141777 uses articulated vanes for VAWT design which can be raised or lowered automatically to regulate the angular speed of rotation of the turbine. Erikson et al. states in their mentioned research that VAWT design essentially operate in drag mode, which limits the speed of rotation and requires larger blade area than the HAWT designs. These trade-offs are acceptable as long the cost of manufacture of blades are reduced.

SUMMARY

The purpose of the invention is a modification of VAWT design which has high energy efficiency, storm protection capability as well as speed regulation capability. The invention uses articulated vanes for VAWT design which can be rotated automatically to regulate the angular speed of rotation of the turbine. Even though the efficiency of VAWT design is theoretically lower than commercial HAWT's, these two features of the invention enable us to scale up the VAWT design which may make up for the lower efficiency. The articulated vanes of the turbine can be rotated in order to hunt for wind when wind speed is lower than expected. The design differs from US 2010/0172759 application by the use of fixed and rotating vanes without retracting the vanes. Also, the design differs from WO 2011/141777 by the use of fixed and rotating vanes without lifting or lowering the vanes.

The main feature of the design is its scalability for mega watt level applications. To achieve the above object, according to the present invention, one case of vertical axis wind turbine generator is connected to the bottom of the generator and eight upper connecting axes and eight lower connecting axes are radially extended from the central shaft, eight impellers are mounted between eight upper shafts and eight lower shafts and one of eight impellers is connected to one of eight wind vanes through one of eight vane angle adjusting devices with coupling blocking fork. The gear reducer module is a planetary gear set and a planetary gear is mounted at the bottom of the upper shaft and the sun gear is connected to the lower shaft and the planetary gear is engaged with the sun gear and linkage, and the rotation of the upper shaft is passed to the lower shaft. The circumference-rotating motion of the impeller and the self-rotating motion is characterized in the ratio of 2:1. This is in order to ensure that the ratio of planetary gear and the sun gear of the planetary gear reducer module is 2:1. The vane angle adjusting device includes coupling blocking fork, which can block the cone clutch from transmitting power when it is necessary to stop the cone clutch and the impeller motion between the gear reducer module and the lower shaft to block the rotation power from the upper shaft to the lower shaft. The cone clutch has the gear reducer module and the upper coupling tightened by the bolts, the upper coupling and the lower coupling are coupled, the lower coupling is supported by the spring, the lower shaft has the tension control nuts, the lower shaft can rotate in different direction from the upper coupling and the lower shaft rotates in the same direction with the lower coupling. The coupling block fork is formed in the upside down "L" letter shape, the bended part is fixed by the pin in the lower shaft bearing cap to cover the lower shaft, the wire is connected in the lower opening of the vertical part, and the coupling block fork is mounted on the upper surface of the horizontal lower coupling. The lower shaft is supported by the support part combined with the bearing cap with bolts.

BRIEF DESCRIPTION OF THE DRAWINGS

Various embodiments of the invention are disclosed in the following detailed description and accompanying drawings.

DETAILED DESCRIPTION OF THE INVENTION

The detailed description of the operation of the vertical axis wind turbine with wind vanes is explained in this section with reference to the accompanying drawings. According to FIG. 1, the vertical axis wind turbine according to the present invention, the generator (2) is connected to the bottom of the central shaft (1), a plurality of radially upper connecting axis (3) and a lower connecting axis (5) is extended from the central shaft (1), the impeller (11) is mounted between the upper connecting axis (3) and a lower connecting axis (5), the impeller (11) is connected to the vane angle adjusting device (31) through the wind vanes (7). There are eight impellers (11) and eight vane angle adjusting devices (31) in the turbine.

Figure 1:
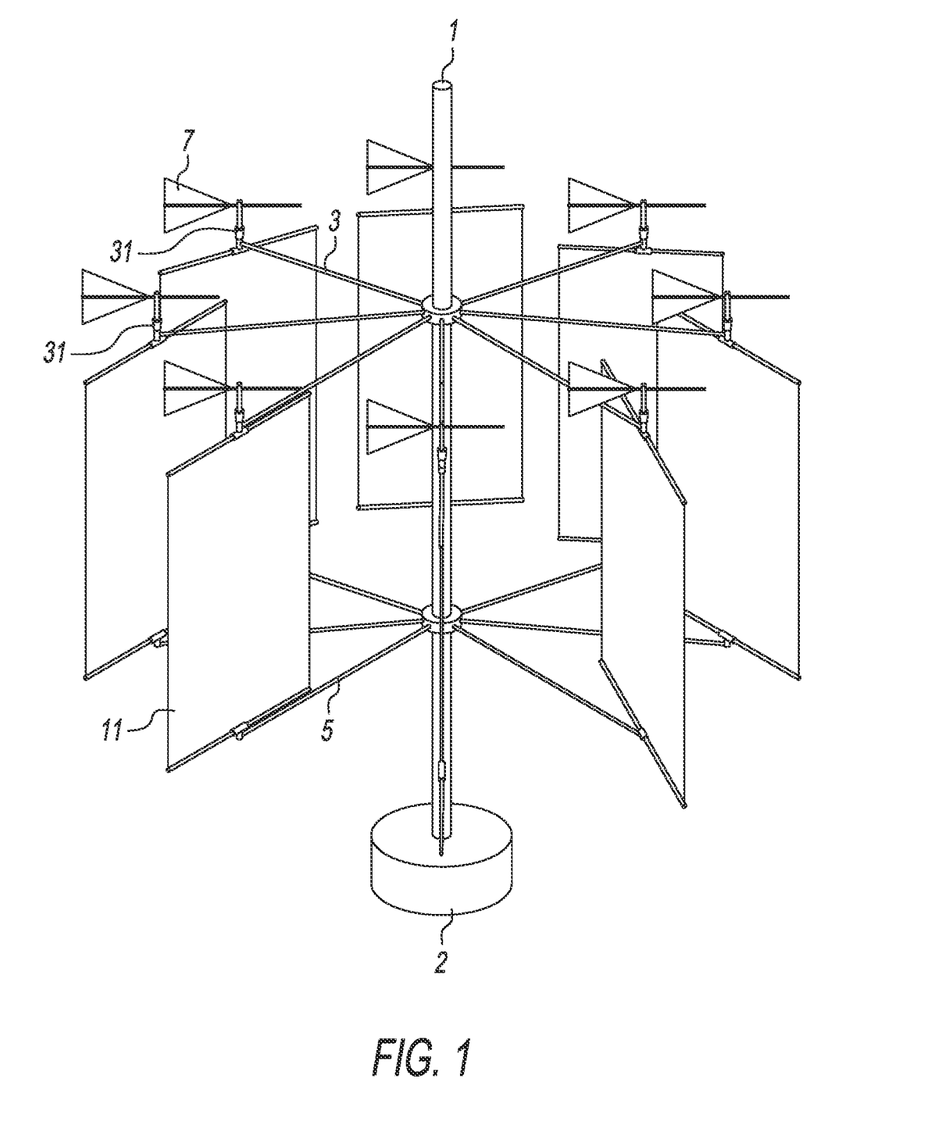
FIG. 1 is a perspective view of a vertical axis wind turbine according to the present invention.
Figure 2:
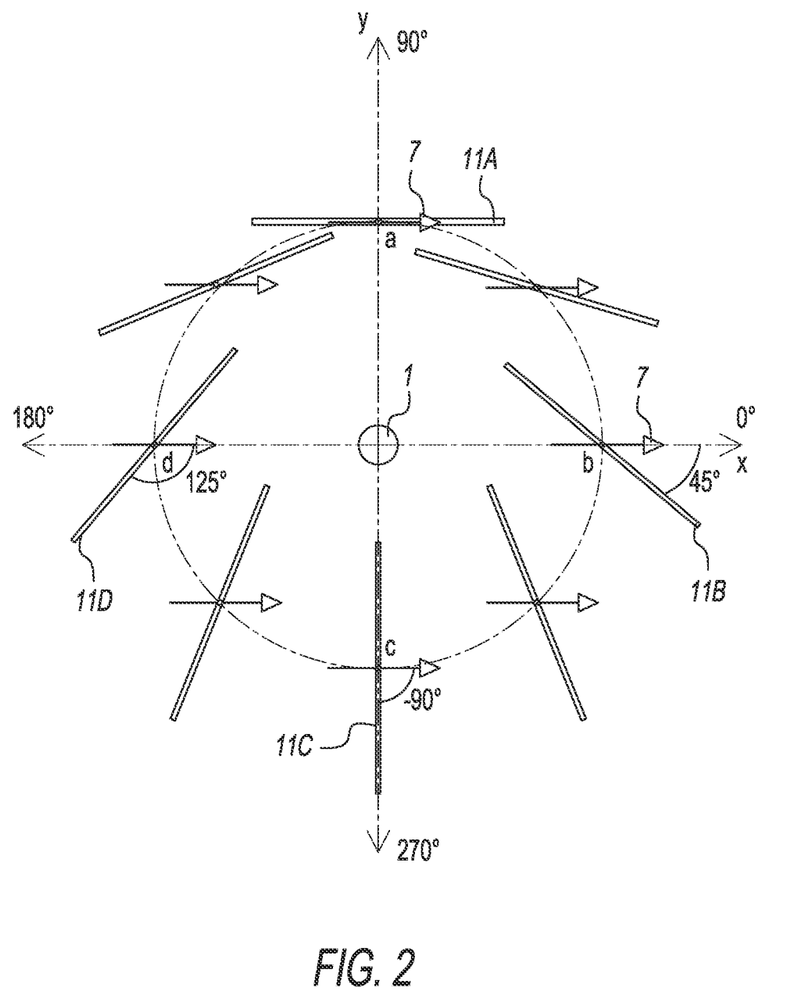
FIG. 2 is a flat schematic of the vertical axis wind turbine to describe the relationship between the wind vane and the impeller.

Referring to FIG. 2, the vertical axis wind turbine according to the present invention operates as follows. The wind vane (7) is always aligned in a straight line in the direction of the wind. Thus, if one assumes that the direction of the wind is the X-axis, the wind vane (7) is always aligned in the direction of the X axis, but the impeller always rotates in the clockwise direction with larger rotation momentum and the impeller (11) maintains a constant angle to the direction of the wind by each control device (31 of FIG. 1) and rotates around the central shaft (1) axis. In other words, a wind vane in place (7) and the impeller (11) facing the direction of the X axis, the impeller circumferential movement (static) and when placed in the b position, vane (7) is rotating consistent with the direction of the wind, the impeller (11b) for the X-axis is placed obliquely in the direction of 45 degrees the vane (7) as the rotation angle of the vane angle adjusting device (15), and the impeller (1) rotates around the central shaft and the impeller is reached to the c-axis position and the wind vane (7) rotates to be consistent with the direction of the wind, the vane angle adjusting device (15) delivers the angle of the wind vane (7) to the impeller (11c), the impeller (1) is positioned to a −90 degree rotation perpendicular to the wind direction and the impeller (11d) is placed obliquely −125 degrees by vane angle adjusting device (15). Thus, the impeller rotation moment is always a big one up the wind movement in the direction of the circumference to the circumference of the impeller by passing the angular motion of the vanes to the front of each vane angle adjusting device (31) and the central shaft (1) rotates, the generator (2) placed to the bottom of the central shaft (1) generates power. In the above example, the wind blows to the wind vane with zero degree, but wind vane (7) aligns in the direction of the wind and the impeller is positioned similarly with the above one example. In addition, in the present invention, the ratio of the rotating movement of the impeller (11) and self rotation is preferably 2:1. As described in the above, when the wind blows the wind vane is always placed to the direction of the wind, but the impeller (11) is placed to confront the wind by the vane angle adjusting device (31). The vane angle adjusting device (31) is explained in the below.

Figure 3:
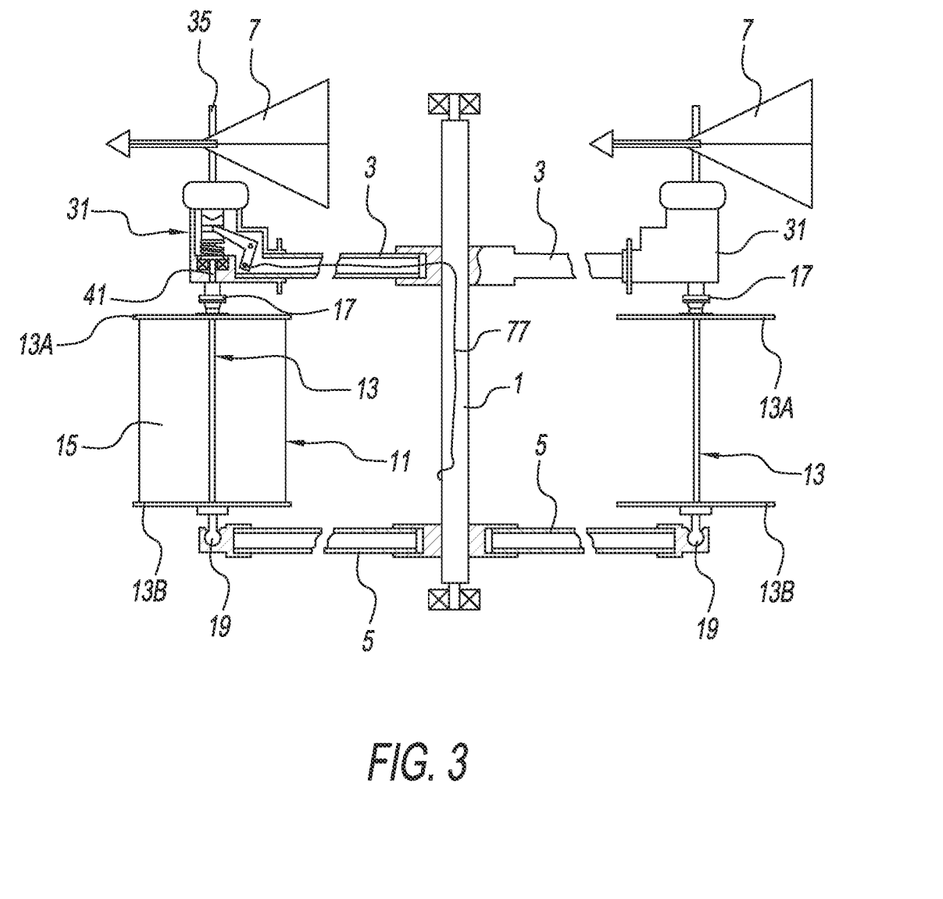
FIG. 3 is a vertical axis wind turbine according to the present invention, a portion of the schematic partial cross-sectional view cut.

Referring to FIG. 3, the impeller (11) is mounted to be rotated after the sail (15) is mounted on the ' 工 ' shape of the frame (13), the upper surface (13a) of the frame (13) is connected to each vane angle adjusting device (31) by a connecting member (17), the ball from the lower surface (13b) of the frame (13) is connected to the lower connecting axis (5). The connecting member (17) is coupled with the lower shaft (41) with a key and the lower part is connected to the upper surface (13a) of the impeller (11).

Figure 4:
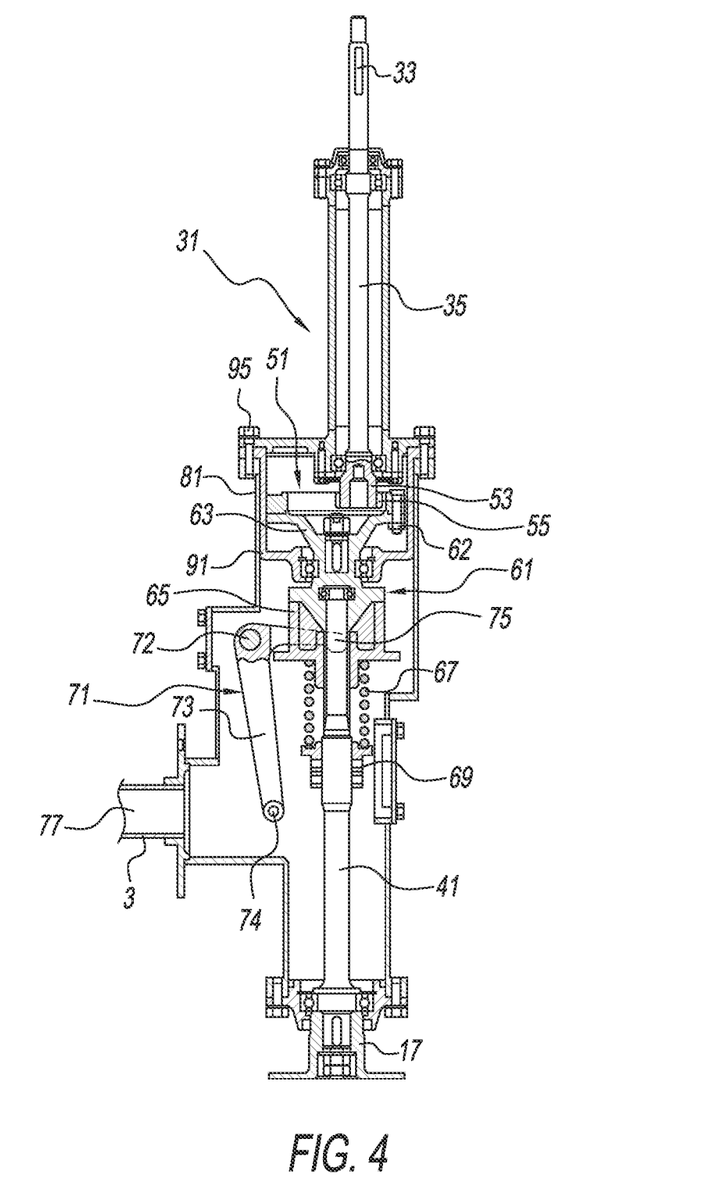
FIG. 4 is a sectional view showing the front of each control device of the vertical blades of the vertical axis wind turbine according to the present invention.

According to FIG. 4, the vane angle adjusting device (31) has the upper shaft (35) with mounting holes (33) and the lower shaft (41) which are connected to the gear reducer module (51) to equip the vane on the top (7; FIGS. 1 and 3). The gear reducer module (51) is referred to as the so-called planetary gear particularly, the planetary gear (53) mounted at the bottom of the upper shaft (35) and the planetary gear (53) is engaged with the sun gear linkage (55), which is connected to the lower shaft (41), and the rotation of the upper shaft (35) is sent to the lower shaft (41). In this way, as shown in FIG. 2, if the impeller moves from point b to point c, the wind vane (7) is aligned in the direction of the wind and the upper shaft (35) and the planetary gear (53) are rotated by the angular rotation of the wind vane (7) and the planetary gear (53) engages in the sun gear (55) rotates and the lower shaft (41) attached to the sun gear (55) rotates by the value of the angular rotation of the sun gear (55) and the impeller (11) is connected to the lower shaft (41) through the connecting part (17) rotates by the angular rotation. That is, as explained with the reference to FIG. 2 in the above, the wind vane (7) at the point b is rotated 45 degrees to the wind to be aligned and the impeller (11) rotates by the angle and the impeller is connected to the lower shaft (41) by the connecting member (17) and the impeller (11) is placed obliquely in the direction of about −45 degrees to X-axis and the impeller rotates by the wind from the point b to point c in circumferential movement. Applying the principles described in the above, the impeller (11) is arranged against the direction of the wind when it moves from point b to point c. The circumference-rotating motion of the impeller and the self-rotating motion is characterized in the ratio of 2:1. This is in order to ensure that the ratio of planetary gear (53) and the sun gear (55) of the planetary gear reducer module (51) is 2:1.

Figure 5:
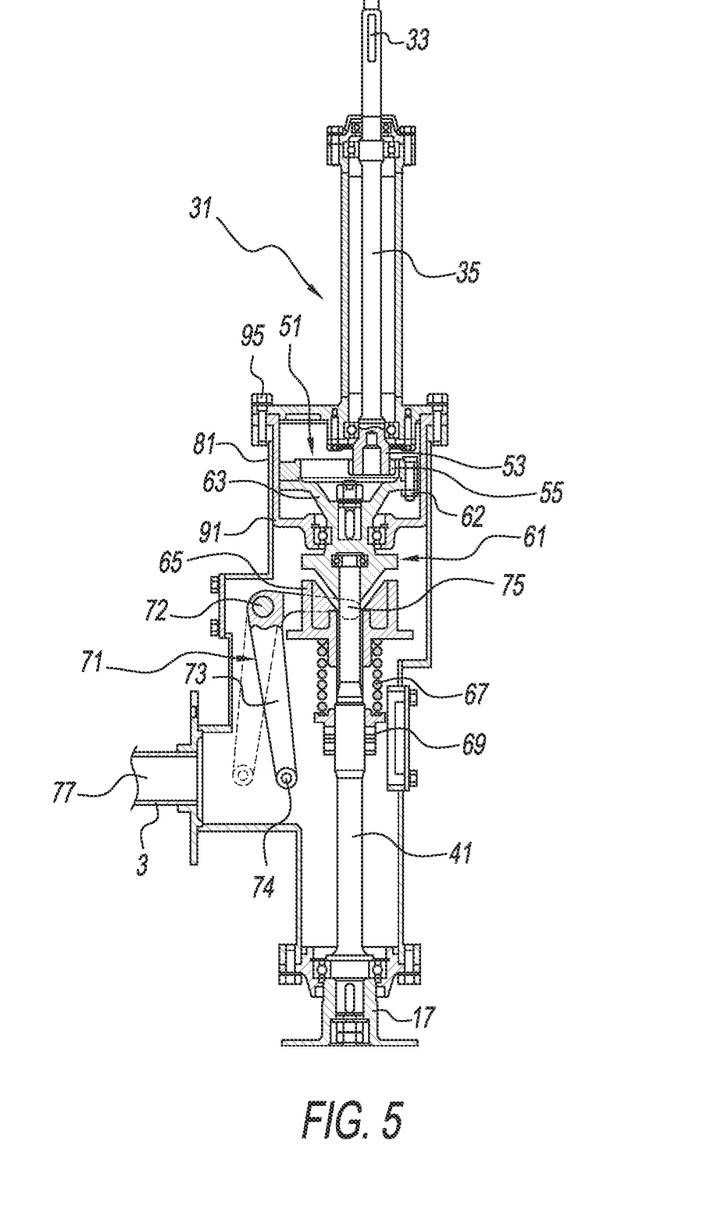
FIG. 5 is a sectional view showing the front of each control device of the vertical blades of the vertical axis wind turbine according to the present invention.

Referring again to FIG. 4, according to the present invention in the vertical axis wind turbine, in order to prevent damage to the impeller (11) and the gear reducer module (51) by strong wind or local gusts, the vane angle adjusting device (31) includes the coupling blocking fork (71) to stop exercising the cone clutch (61), which is mounted between the gear reducer module (51) and the lower shaft (41), from transmitting power when the rotating power of the wind vane (7) should be blocked from the lower power shaft (41). The cone clutch (61) has the gear reducer module (51) and the upper coupling tightened by the bolts (62), the upper coupling (63) and the lower coupling (65) are coupled, the lower coupling (65) is supported by the spring (67), the lower shaft (41) has the tension control nuts (69) which is mounted on the lower coupling (65), the lower shaft (65) can rotate in different direction from the upper coupling (63) and the lower shaft (41) rotate in the same direction with the lower coupling (65). In this way, each vane angle adjusting device (31), the upper part of the shaft (35) mounted on a planetary gear (53) engaged with the sun gear (55) by rotating the top of the rapid coupling (63) of the rotation moment and when exceeded the threshold value index as shown in FIG. 5, the lower shaft (41) coupled with the lower coupling (65), the upper shaft (35) to deliver the power of the upper coupling (63) is disconnected from the spring (67) of the elastic force, so the lower coupling (65) goes down to the bottom and the power transmission from the top shaft (35) to the lower shaft (41) is stopped. Thus, the rotating power from the wind vane (7) to the impeller (11) is blocked and the impeller (11) can be moved freely and the impeller (11) is not damaged by the wind. In addition, if the winds become weak, the lower coupling (65) is combined with the upper coupling (63) and the power from the upper shaft (35) is passed to the lower shaft (41) and the impeller (11) will have a constant direction against the wind.

Figure 6:
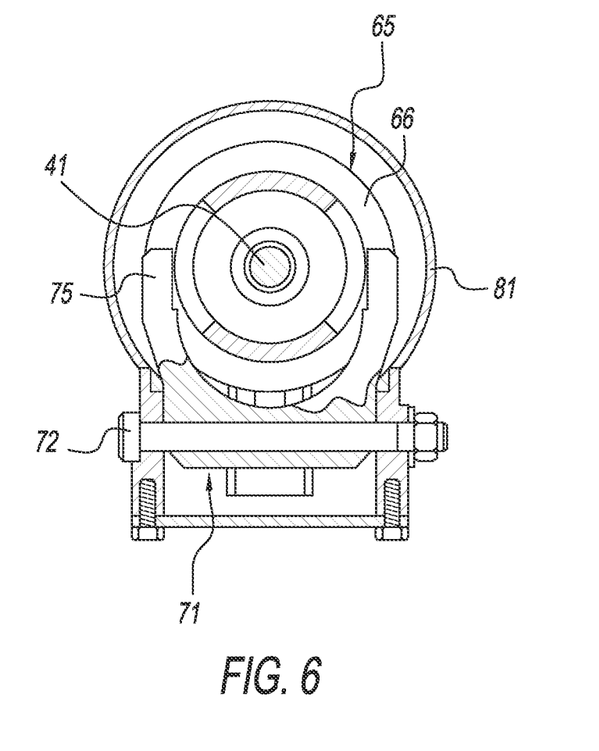
FIG. 6 is a sectional view taken along the line A-A of FIG. 4.

According to FIGS. 4, 5 and 6, the coupling block fork (71) is formed in the upside down "L" letter shape, the bended part is fixed by the pin (73) in the lower shaft bearing cap (81) to cover the lower shaft (41), the wire (77) is connected in the lower opening (74) of the vertical part (73), and the horizontal part (75) is mounted on the upper surface (66) of the horizontal lower coupling (65) per FIG. 6. As described above, if the wire (77) is pulled, the fork coupling block (71) is rotated around the pin (73) and the horizontal part (75) is forced to push out the lower coupling (65). By this the upper coupling (63) and the lower coupling (65) are separated and the power transmission form the upper shaft (35) to the lower shaft (41) is blocked and the rotary motion of the impeller (11) is stopped.

According to FIGS. 4 and 5, the lower shaft (41) is supported by the bolts (95) and the bearing cap (81) coupled with the support part (1) in the above vertical axis wind power turbine according to the present invention.

The invention claimed is:

1. An energy generating vertical axis wind turbine comprising:
   eight impellers, eight upper shafts, eight lower shafts, eight wind vanes, and eight vane angle adjusting devices,
   each vane angle adjusting device comprising a coupling block fork and a gear reducing module,
   the wind turbine further comprising a generator wherein a central rotating shaft is connected to a bottom of the generator and eight upper connecting axes and eight lower connecting axes are radially extending from the central rotating shaft, each of the eight impellers is mounted between a respective one of the eight upper shafts and a respective one of the eight lower shafts and each of the eight impellers is connected to a respective one of the eight wind vanes through a respective one of the eight vane angle adjusting devices with the coupling block fork,
   wherein each of the eight vane angle adjusting devices connects to the respective one of the eight upper shafts with mounting holes, the respective one of the eight lower shafts connected to the gear reducing module to equip the respective one of the eight wind vanes to stop power transmission, and each of the eight vane angle adjusting devices has a cone clutch which is mounted between the gear reducing module and the respective one of the eight lower shafts to stop power transmission using the coupling block fork,
   wherein the coupling block fork of each of the eight vane angle adjusting devices is formed in an upside down "L" letter shape, a bended part is fixed by a pin in a bearing cap of the respective one of the eight lower shafts to cover the respective one of the eight lower shafts, and
   a wire of each of the eight vane angle adjusting devices is connected to a lower opening of a vertical part of the coupling block fork, and a horizontal part of the coupling block fork is mounted on an upper surface of a horizontal lower coupling in the vertical axis wind turbine.

2. The vertical axis wind turbine of claim 1, wherein each of the eight vane angle devices has the mounting holes for the respective one of the eight wind vanes on a top of the respective one of the eight upper shafts and the respective one of the eight upper shafts and the respective one of the eight lower shafts connected to the gear reducing module.

3. The vertical axis wind turbine of claim 2, wherein the gear reducing module of each of the eight vane angle adjusting devices is a planetary gear set and a planetary gear is mounted at a bottom of the respective one of the eight upper shafts and the planetary gear is engaged with a sun gear and linkage, wherein the sun gear is connected to the respective one of the eight lower shafts and a rotation of the respective one of the eight upper shafts is passed to the respective one of the eight lower shafts.

4. The vertical axis wind turbine of claim 3, wherein a ratio of a circumference-rotating motion and a self-rotating motion of the respective one of the eight impellers is 2:1 in order to ensure that the ratio of the planetary gear and the sun gear of the gear reducing module of each of the eight vane angle adjusting devices is 2:1.

5. The vertical axis wind turbine of claim 2, wherein the respective one of the eight lower shafts is supported by the bearing cap combined with a support member by bolts.

6. The vertical axis wind turbine of claim 1, wherein each of the eight vane angle adjusting devices has cone clutch mounted with the gear reducing module and an upper coupling tightened by bolts, the upper coupling and a lower coupling are coupled, the lower coupling is supported by a spring, the respective one of the eight lower shafts has tension control nuts which are mounted on the lower coupling, the respective one of the eight lower shafts rotates in a different direction from the upper coupling and the lower shaft rotates in the same direction with the lower coupling.

7. The vertical axis wind turbine of claim 1, wherein the respective one of the eight lower shafts is supported by the bearing cap combined with a support member by bolts.

8. An energy generating vertical axis wind turbine comprising:
  eight impellers, eight upper shafts, eight lower shafts, eight rotating wind vanes, and eight vane angle adjusting devices,
  each vane angle adjusting device comprising a coupling block fork, and a gear reducing module,
  the wind turbine further comprising a generator wherein a central rotating shaft is connected to a bottom of the generator and eight upper connecting axes and eight lower connecting axes are radially extending from the central rotating shaft, each of the eight impellers is mounted between a respective one of the eight upper shafts and a respective one of the eight lower shafts and each of the eight impellers is connected to a respective one of the eight rotating wind vanes through a respective one of the eight vane angle adjusting devices with the coupling block fork,
  wherein each of the eight vane angle adjusting devices connects to the respective one of the eight upper shafts with mounting holes, the respective one of the eight lower shafts connected to the gear reducing module to equip the respective one of the eight rotating wind vanes to stop power transmission, and each of the eight vane angle adjusting devices has a cone clutch which is mounted between the gear reducing module and the respective one of the eight lower shafts to stop power transmission using the coupling block fork,
  wherein the coupling block fork of each of the eight vane angle adjusting devices is formed in an upside down "L" letter shape, a bended part is fixed by a pin in a bearing cap of the respective one of the eight lower shafts to cover the respective one of the eight lower shafts, and
  a wire of each of the eight vane angle adjusting devices is connected to a lower opening of a vertical part of the coupling block fork, and a horizontal part of the coupling block fork is mounted on an upper surface of a horizontal lower coupling in the vertical axis wind turbine.

9. The vertical axis wind turbine of claim 8, wherein each of the eight vane angle devices has the mounting holes for the respective one of the eight rotating wind vanes on a top of the respective one of the eight upper shafts and the respective one of the eight upper shafts and the respective one of the eight lower shafts connected to the gear reducing module.

10. The vertical axis wind turbine of claim 9, wherein the gear reducing module of each of the eight vane angle adjusting devices is a planetary gear set and a planetary gear is mounted at a bottom of the respective one of the eight upper shafts and the planetary gear is engaged with a sun gear and linkage, wherein the sun gear is connected to the respective one of the eight lower shafts and a rotation of the respective one of the eight upper shafts is passed to the respective one of the eight lower shafts.

11. The vertical axis wind turbine of claim 10, wherein a ratio of a circumference-rotating motion and a self-rotating motion of the respective one of the eight impellers is 2:1 in order to ensure that the ratio of the planetary gear and the sun gear of the gear reducing module of each of the eight vane angle adjusting devices is 2:1.

12. The vertical axis wind turbine of claim 9, wherein the respective one of the eight lower shafts is supported by the bearing cap combined with a support member by bolts.

13. The vertical axis wind turbine of claim 8, wherein each of the eight vane angle adjusting devices has the cone clutch mounted with the gear reducing module and an upper coupling tightened by bolts, the upper coupling and a lower coupling are coupled, the lower coupling is supported by a spring, the respective one of the eight lower shafts has tension control nuts which are mounted on the lower coupling, the respective one of the eight lower shafts rotates in a different direction from the upper coupling and the lower shaft rotates in the same direction with the lower coupling.

14. The vertical axis wind turbine of claim 8, wherein the respective one of the eight lower shafts is supported by the bearing cap combined with a support member by bolts.

* * * * *